United States Patent
Lee et al.

(10) Patent No.: US 9,788,342 B2
(45) Date of Patent: Oct. 10, 2017

(54) METHOD FOR TRANSMITTING AND RECEIVING CONTROL INFORMATION IN WIRELESS COMMUNICATIONS SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 14/766,284

(22) PCT Filed: Feb. 21, 2014

(86) PCT No.: PCT/KR2014/001440
§ 371 (c)(1),
(2) Date: Aug. 6, 2015

(87) PCT Pub. No.: WO2014/129848
PCT Pub. Date: Aug. 28, 2014

(65) Prior Publication Data
US 2016/0007374 A1    Jan. 7, 2016

Related U.S. Application Data

(60) Provisional application No. 61/803,113, filed on Mar. 18, 2013, provisional application No. 61/767,762, filed on Feb. 21, 2013.

(51) Int. Cl.
*H04W 72/12* (2009.01)
*H04J 11/00* (2006.01)
(Continued)

(52) U.S. Cl.
CPC ......... *H04W 72/1289* (2013.01); *H04J 11/00* (2013.01); *H04L 1/0046* (2013.01);
(Continued)

(58) Field of Classification Search
CPC .............................. H04W 84/18; H04W 84/12
See application file for complete search history.

(56) References Cited

U.S. PATENT DOCUMENTS

2010/0235705 A1    9/2010    Kim et al.
2013/0039297 A1*   2/2013    Wang .................. H04W 76/045
                                              370/329

(Continued)

FOREIGN PATENT DOCUMENTS

EP      2 567 838 A1    2/2013
KR      10-0913094 B1   8/2009
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.1.0, Dec. 2012, pp. 1-160, (Total pp. 161).

*Primary Examiner* — Raj Jain
*Assistant Examiner* — Zhiren Qin
(74) *Attorney, Agent, or Firm* — Birch, Stewart, Kolasch & Birch, LLP

(57) ABSTRACT

The present invention relates to a method for a terminal to receive downlink control information in a wireless communications system and an apparatus therefor. More specifically, the method is characterized by comprising a step for receiving downlink control information (DCI) indicating whether to retransmit an uplink or not, wherein DCI is defined to simultaneously transmit whether to retransmit the uplink for each of the plurality of terminals.

9 Claims, 13 Drawing Sheets

(51) Int. Cl.
*H04L 1/00* (2006.01)
*H04W 72/04* (2009.01)
*H04W 88/02* (2009.01)
*H04W 88/08* (2009.01)

(52) U.S. Cl.
CPC ....... *H04L 1/0072* (2013.01); *H04W 72/0406* (2013.01); *H04W 72/0446* (2013.01); *H04W 88/02* (2013.01); *H04W 88/08* (2013.01)

(56) References Cited

U.S. PATENT DOCUMENTS

| | | | | |
|---|---|---|---|---|
| 2014/0321406 | A1* | 10/2014 | Marinier | H04B 7/024 370/329 |
| 2015/0003311 | A1* | 1/2015 | Feuersaenger | H04W 52/0225 370/311 |
| 2015/0296542 | A1* | 10/2015 | Heo | H04W 74/0833 370/329 |

FOREIGN PATENT DOCUMENTS

| | | |
|---|---|---|
| KR | 10-0945860 B1 | 3/2010 |
| KR | 10-2011-0051156 A | 5/2011 |
| KR | 10-2012-0068858 A | 6/2012 |

\* cited by examiner

FIG. 2
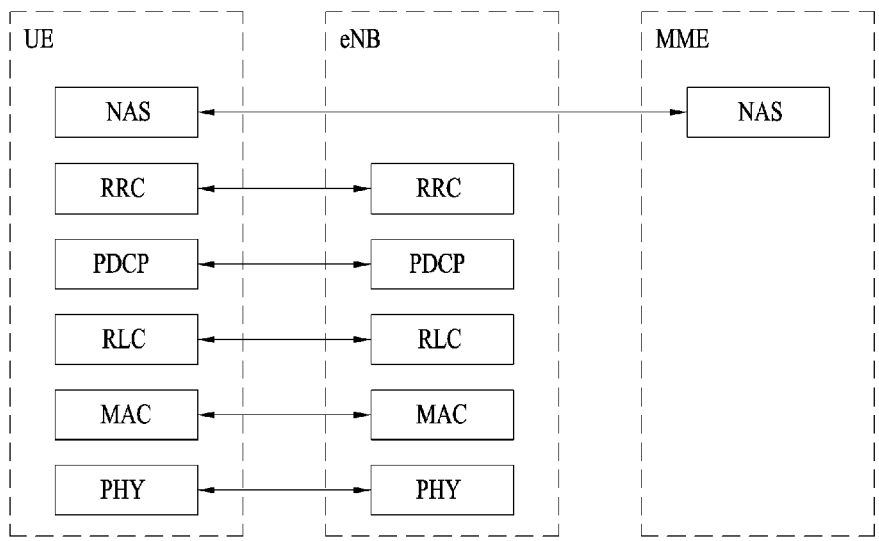
(a) control-plane protocol stack
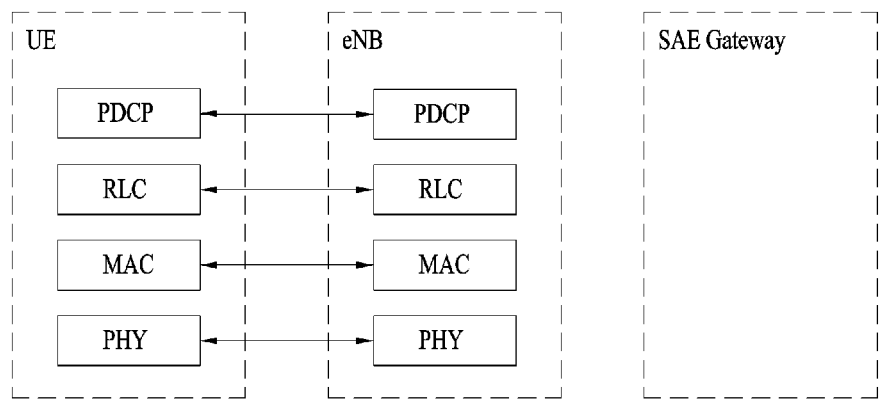
(b) user-plane protocol stack FIG. 7
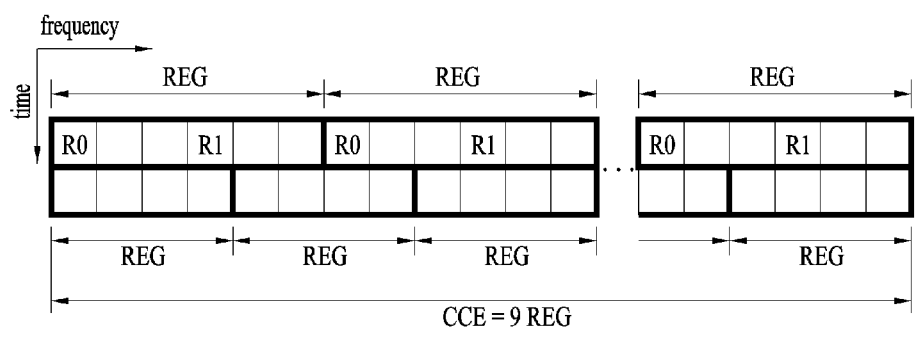
(a) 1 TX or 2 TX
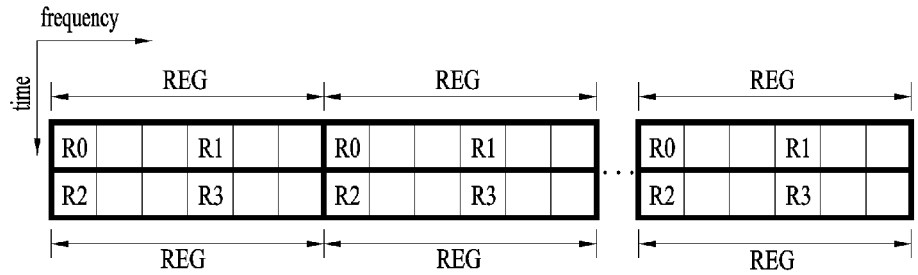
(b) 4 TX ID="1" />
METHOD FOR TRANSMITTING AND RECEIVING CONTROL INFORMATION IN WIRELESS COMMUNICATIONS SYSTEM AND APPARATUS THEREFOR

CROSS REFERENCE TO RELATED APPLICATIONS

This application is the National Phase of PCT/KR2014/001440 filed on Feb. 21, 2014, which claims priority under 35 U.S.C. 119(e) to U.S. Provisional Application No. 61/767,762 filed on Feb. 21, 2013 and U.S. Provisional Application No. 61/803,113 filed on Mar. 18, 2013, all of which are hereby expressly incorporated by reference into the present application.

BACKGROUND OF THE INVENTION

Field of the Invention

The present invention relates to a wireless communication system, and more particularly, to a method of transmitting and receiving control information in a wireless communication system and an apparatus therefor.

Discussion of the Related Art

A 3rd generation partnership project long term evolution (3GPP LTE) (hereinafter, referred to as 'LTE') communication system which is an example of a wireless communication system to which the present invention can be applied will be described in brief FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

SUMMARY OF THE INVENTION

An object of the present invention is to provide a method of transmitting and receiving control information in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, according to one embodiment, a method of receiving downlink control information (DCI), which is received by a user equipment (UE) in a wireless communication system, is provided according to one embodiment. The DCI can be received by monitoring a radio resource region. The DCI can be detected by borrowing a part of a count of blind decoding assigned to a UE-specific search space (USS). The radio resource region is not on the USS. The DCI indicates whether or not uplink retransmission is to be performed. The DCI is simultaneously transmitted to each of a plurality of UEs to indicate whether or not the uplink transmission is to be performed.

The method can further include the step of receiving information on a position of a field to which an identifier of the UE is assigned in the DCI.

A position of a field to which an identifier of the UE is assigned in the DCI can be determined according to a total number of fields in which indication information on whether the uplink retransmission is performed is transmitted.

To further achieve these and other advantages and in accordance with the purpose of the present invention, a method of receiving DCI, which is received by a UE in a wireless communication system, is provided according to a different embodiment. The DCI can be received by monitoring a radio resource region. The DCI can be detected by borrowing a part of a count of blind decoding assigned to a USS. The radio resource region is not on the USS. The DCI indicates whether or not uplink transmission is to be performed. The DCI is simultaneously transmitted to each of a plurality of UE groups to indicate whether or not the uplink retransmission is to be performed. Each of the UE groups comprises at least one or more UEs having an identical group identifier.

The uplink retransmission may correspond to non-adaptive retransmission-based uplink retransmission.

Each UE group can include a radio resource region commonly set to the UE group to monitor the DCI.

To further achieve these and other advantages and in accordance with the purpose of the present invention, a UE for receiving DCI in a wireless communication system is provided according to a different embodiment. The UE can include a radio frequency (RF) unit and a processor coupled to the RF unit. The DCI can be received by monitoring a radio resource region. The DCI can be detected by borrowing a part of a count of blind decoding assigned to a UE-specific search space (USS). The radio resource region is not on the USS. The DCI indicates whether or not uplink retransmission is to be performed. The DCI is simultaneously transmitted to each of a plurality of UEs to indicate whether or not the uplink transmission is to be performed.

According to the present invention, it is able to efficiently transmit and receive control information in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 7 is a diagram for a resource unit used for configuring a downlink control channel in LTE system;

DETAILED DESCRIPTION OF THE INVENTION

Figure 1:
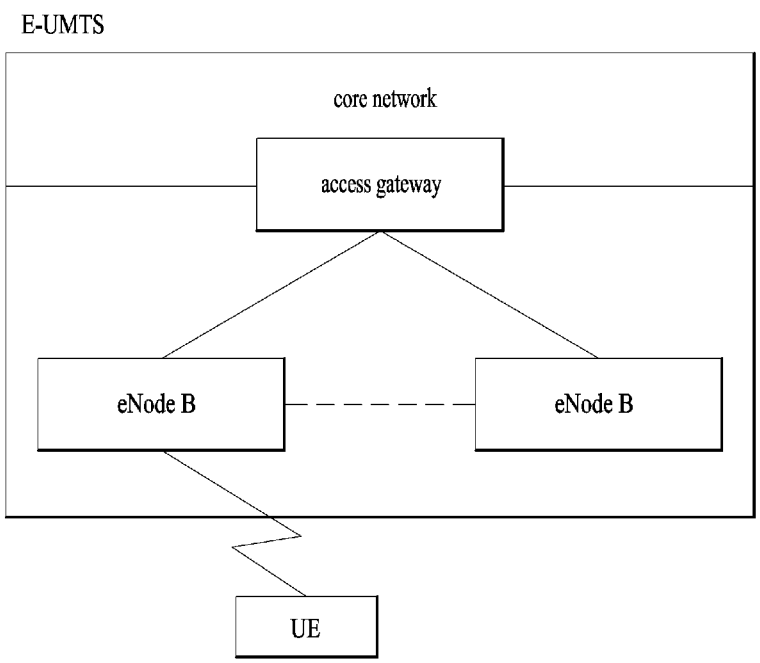
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
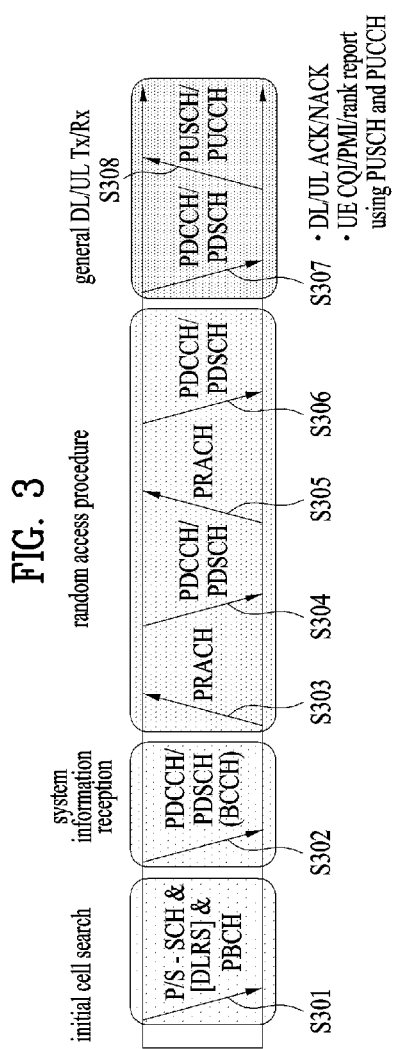
FIG. 3 is a diagram for explaining physical channels used for 3GPP system and a general signal transmission method using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
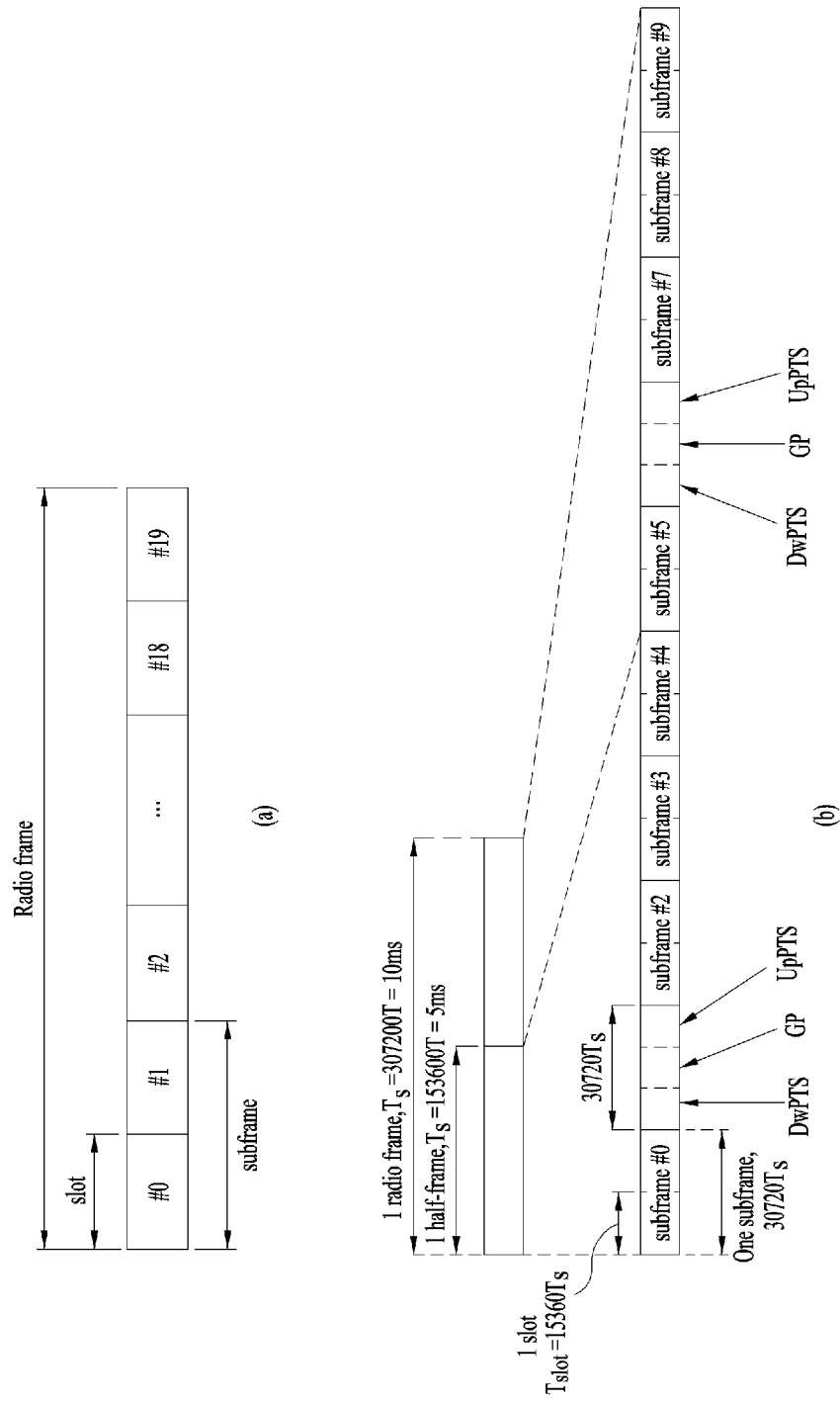
FIG. 4 is a diagram for a structure of a radio frame in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(*a*) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols.

At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

frame. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
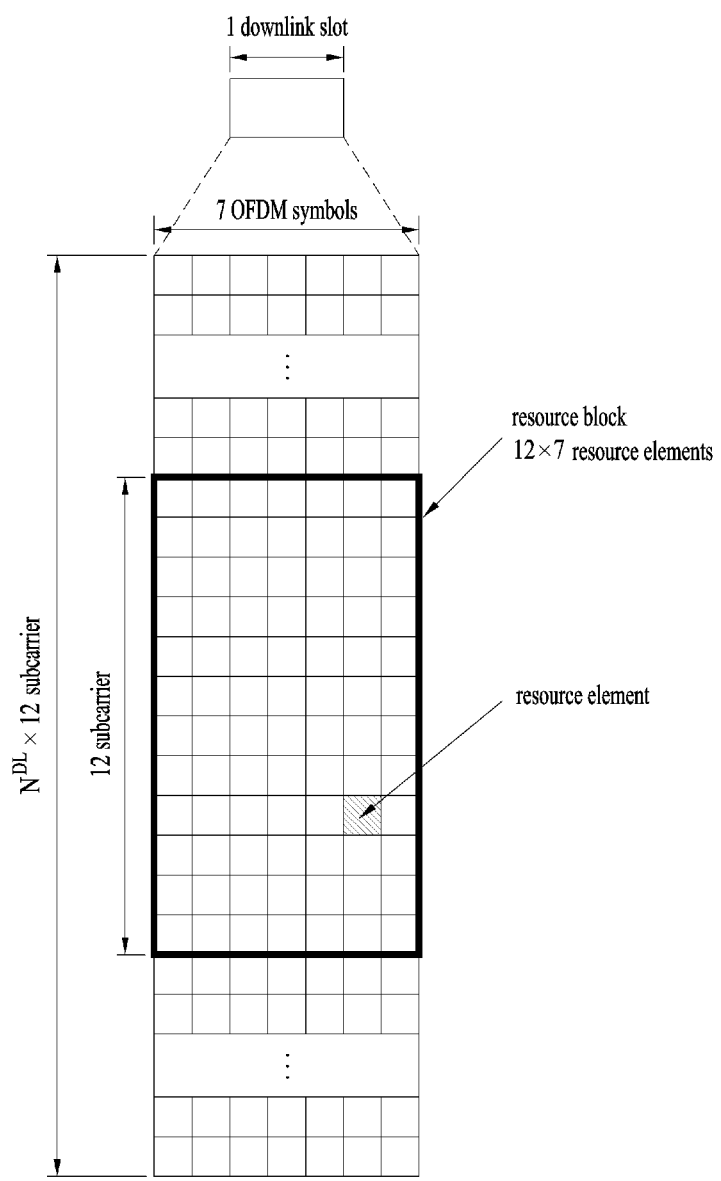
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subnumber $N_{RB}^{DL}$ of resource blocks included in the downlink slot depends on a downlink transmission bandwidth configured in the cell.

Figure 6:
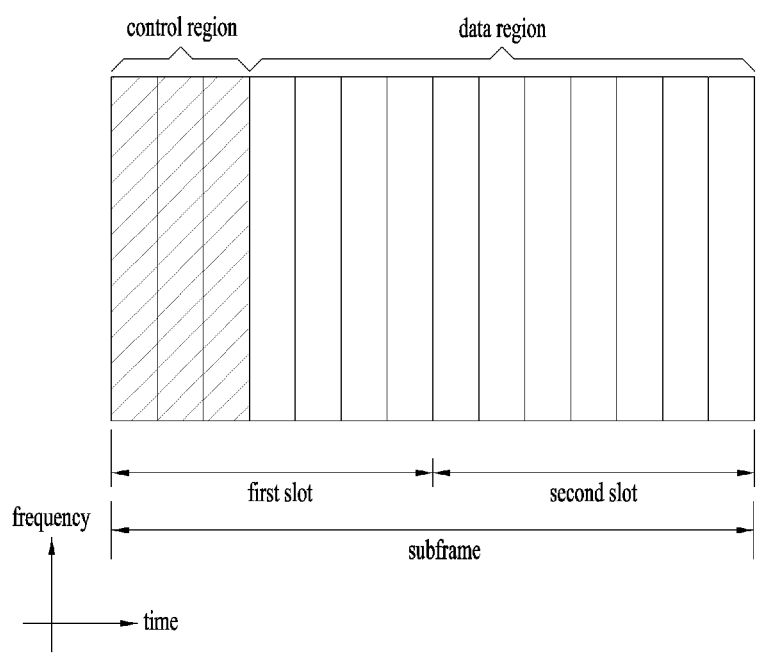
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 is a diagram for a resource unit used for configuring a downlink control channel in LTE system. In particular, FIG. 7 (a) indicates a case that the number of transmitting antennas of an eNode B corresponds to 1 or 2 and FIG. 7 (b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 7, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}$ ($\geq L$) number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 3 in the following.

TABLE 3

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L indicates the number of CCE consisting of PDCCH, $S_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

Figure 8:
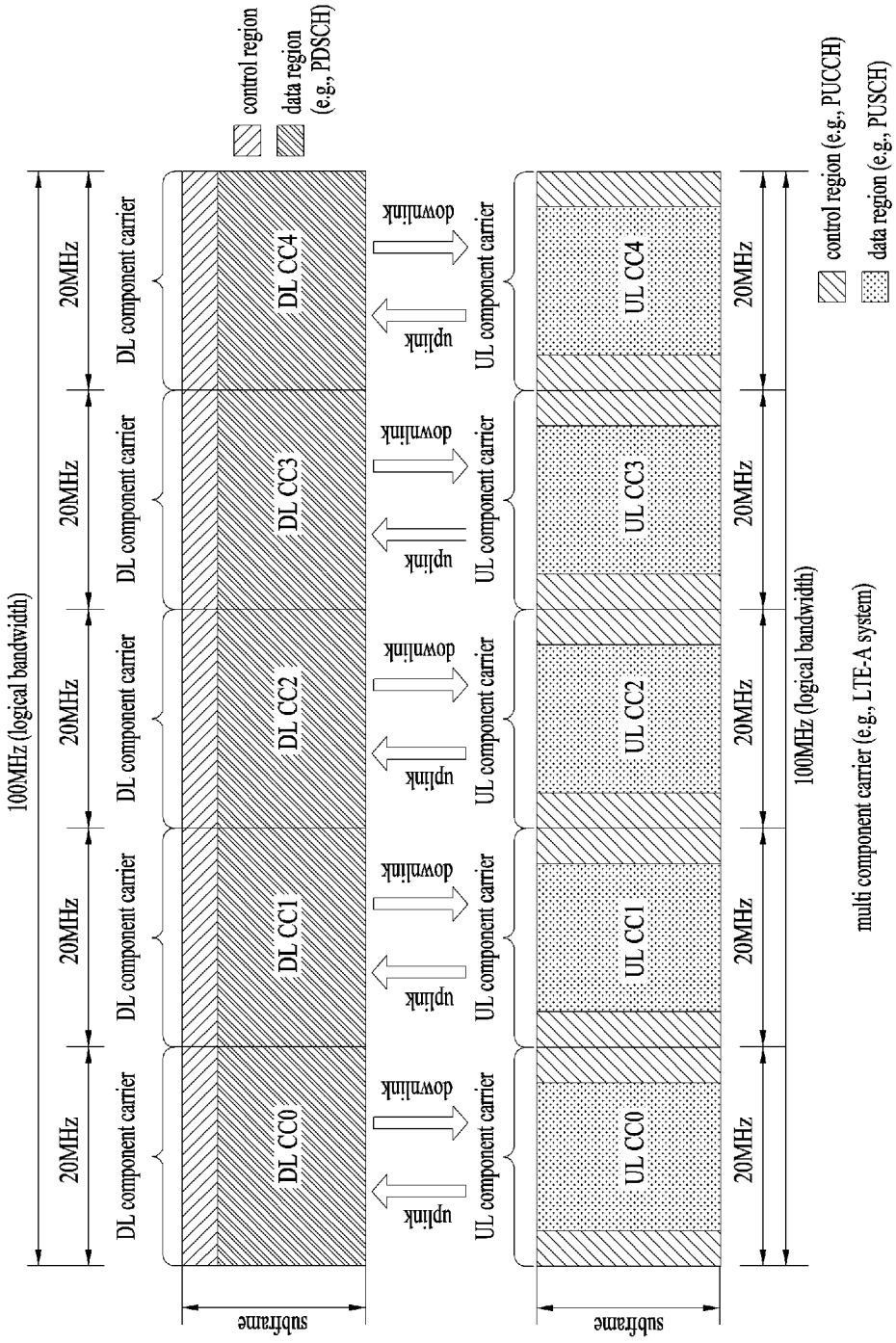
FIG. 8 is a diagram for an example of a carrier aggregation (CA) communication system.

FIG. 8 is a diagram for an example of a carrier aggregation (CA) communication system.

Referring to FIG. 8, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As an example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling). A baseline of PDCCH transmission can be summarized as follows.

CIF disabled: PDCCH on DL CC allocates a PDSCH resource on the same DL CC or a PUSCH resource on a singly linked UL CC.

No CIF

Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.

Expanded LTE DCI format including a CIF

CIF (if configured) is a stationary x-bit field (e.g., x=3)

CIF (if configured) position is fixed irrespective of a DCI format size

Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 9:
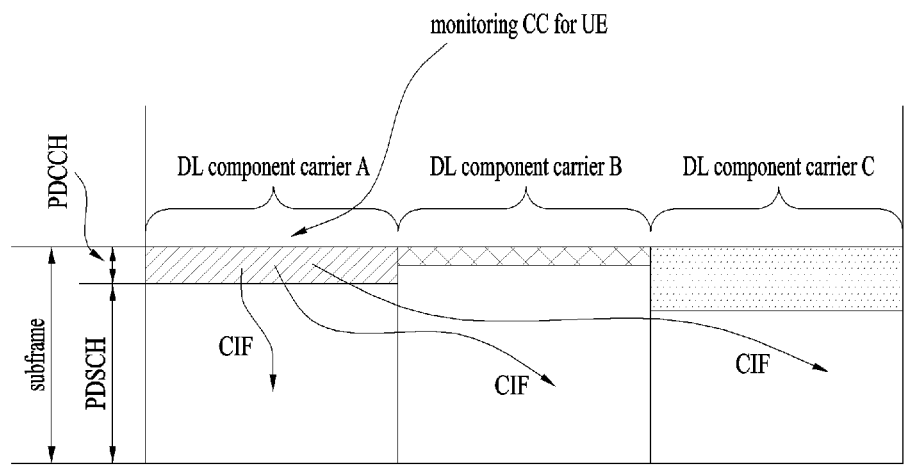
FIG. 9 is a diagram for an example of scheduling in case of aggregating a plurality of carriers with each other.

FIG. 9 is a diagram for an example of a scheduling in case that a plurality of carriers are aggregated with each other. Assume that 3 DL CCs are aggregated with each other and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 10:
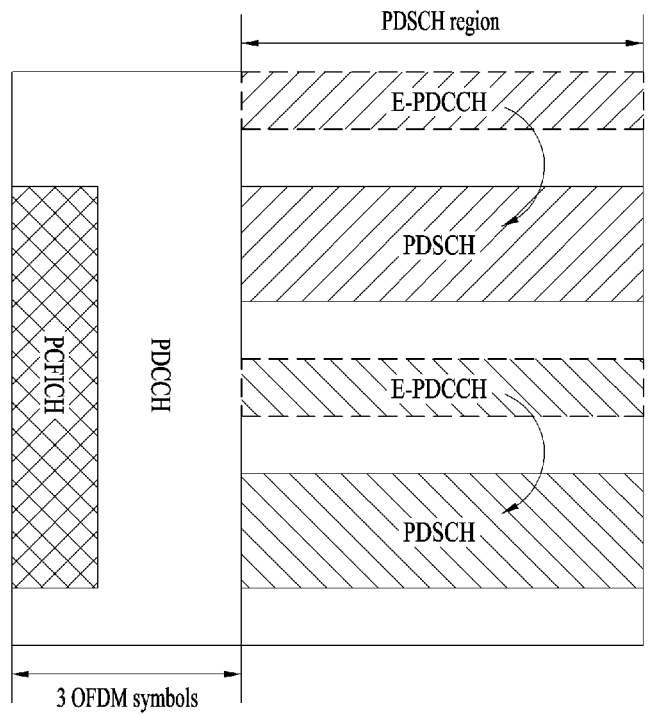
FIG. 10 is a diagram for an example of EPDCCH and PDSCH scheduled by the EPDCCH.

FIG. 10 is a diagram for an example of EPDCCH and PDSCH scheduled by the EPDCCH.

Referring to FIG. 10, in general, EPDCCH can be used in a manner of defining a part of a PDSCH region transmitting data and a UE should perform blind decoding to detect whether the UE detects EPDCCH of the UE. Although EPDCCH performs a scheduling operation (i.e., PDSCH, PUSCH control) identical to a scheduling operation of a legacy PDCCH, if the number of UEs accessing such a node as an RRH is increasing, the greater numbers of EPDCCHs are assigned to a PDSCH region and the count of blind decoding performed by a UE is increasing. Hence, there may exist a demerit in that complexity may increase.

EPDCCH assignment is described in more detail. One or two EPDCCH-PRB sets can be configured in each serving cell via upper layer signaling to monitor EPDCCH of a UE. Each of the EPDCCH-PRB sets can be configured for localized EPDCCH transmission or distributed EPDCCH transmission. Hence, a UE can monitor control information on a set of EPDCCH candidates of at least one or more activated serving cells configured via upper layer signaling.

In this case, the set of the EPDCCH candidates for detecting (or monitoring/blind decoding (BD)) the control information is defined by an EPDCCH USS (UE-specific search space) unit and EPDCCH USS (i.e., $ES_k^{(L)}$) for an aggregation level $L \in \{1, 2, 4, 8, 16, 32\}$ is defined as the set of the EPDCCH candidates.

For instance, when a CIF (carrier indicator field) for a serving cell in which EPDCCH is detected is not configured, if an aggregation level corresponds to L in the set of the EPDCCH candidates for the serving cell in which EPDCCH is detected, the number of monitoring EPDCCH candidates (hereinafter, $M_p^{(L)}$) can be defined as Table 4 and Table 5 in the following. In the present specification, for clarity, the number of EPDCCH candidates of a sole distributed EPDCCH-PRB set is explained. Explanation on the other cases is replaced by contents written on 3GPP TS 36.213.

TABLE 4

| | Number of EPDCCH candidates $M_p^{(L)}$ for Case 1 | | | | | Number of EPDCCH candidates $M_p^{(L)}$ for Case 2 | | | | |
| --- | --- | --- | --- | --- | --- | --- | --- | --- | --- | --- |
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

TABLE 5

Number of EPDCCH candidates $M_p^{(L)}$ for Case 3

| $N_{RB}^{X_p}$ | L = 1 | L = 2 | L = 4 | L = 8 | L = 16 |
|---|---|---|---|---|---|
| 2 | 8 | 4 | 2 | 1 | 0 |
| 4 | 4 | 5 | 4 | 2 | 1 |
| 8 | 4 | 4 | 4 | 2 | 2 |

In this case, $N_{RB}^{X_p}$ corresponds to the number of PRB pairs consisting of EPDCCH-PRB set P. Table 4 and Table 5 indicates a case of a sole distributed EPDCCH-PRB set. On the contrary, when a CIF (carrier indicator field) for a serving cell in which EPDCCH is monitored is configured, if an aggregation level corresponds to L in the set of the EPDCCH candidates for the serving cell in which EPDCCH is monitored, the number of monitoring EPDCCH candidates can be defined by the number of EPDCCH candidates according to the aggregation level (L) in EPDCCH-PRB set related to a serving cell indicated by a CIF value (i.e., $n_{CI}$).

Additionally, if a CIF (carrier indicator field) for a serving cell in which EPDCCH is monitored is not configured, it may be configured to follow downlink bandwidth configuration of the serving cell in which EPDCCH is monitored (i.e., $N_{RB}^{DL}=N_{RF}^{DL}$, In this case, $N_{RF}^{DL}$ corresponds to the downlink bandwidth configuration). Yet, if the CIF for the serving cell in which the EPDCCH is monitored is configured, it may be configured to follow a downlink bandwidth configuration of the serving cell indicated by a CIF value (i.e., $n_{CI}$).

Moreover, case 1 to case 3 shown in Table 4 and Table 5 can be classified according to a reference described in the following.

Case 1:

If DCI format 2/2A/2B/2C/2D are detected and $\hat{N}_{RB}^{DL} \geq 25$, a normal subframe including a normal downlink CP If DCI format 2/2A/2B/2C/2D are detected and $\hat{N}_{RB}^{DL} \geq 25$, a special subframe following a special subframe configuration 3, 4 and 8 and including a normal downlink CP If DCI format 1A/1B/1D/1/2/2A/2B/2C/2D/0/4 are detected and the number of REs usable for transmitting EPDCCH is less than 104 (i.e., $n_{EPDCCH}<104$), a normal subframe including a normal downlink CP If DCI format 1A/1B/1D/1/2/2A/2B/2C/2D/0/4 are detected and the number of REs usable for transmitting EPDCCH is less than 104 (i.e. $n_{EPDCCH}<104$), a special subframe following a special subframe configuration 3, 4 and 8 and including a normal downlink CP Case 2:

If DCI format 1A/1B/1D/1/2/2A/2B/2C/2D/0/4 are detected, a normal subframe including an extended downlink CP If DCI format 1A/1B/1D/1/2/2A/2B/2C/2D/0/4 are detected, a special subframe following a special subframe configuration 1, 2, 6, 7 and 9 and including a normal downlink CP If DCI format 1A/1B/1D/1/2/2A/2B/2C/2D/0/4 are detected, a special subframe following a special subframe configuration 1, 2, 3, 5 and 6 and including an extended downlink CP Case 3:

Case except the Case 1 and the Case 2

In the following description, the present invention proposes a method for a base station to efficiently indicate whether uplink control/data (received from a UE) is (re) transmitted based on the aforementioned description. In this case, the uplink control/data of the UE can be (re)transmitted by a predetermined uplink resource (on system information) and/or a downlink resource changed to an uplink usage via dynamic change of a radio resource usage and the like. Moreover, in the present invention, it is necessary to comprehended as whether to (re)transmit includes not only whether to retransmit initial transmission but also whether to retransmit re-retransmission.

In the following description, for clarity, embodiments of the present invention are explained based on 3GPP LTE system. Yet, a range of a system to which the present invention is applied can be extended to other systems except 3GPP LTE system. The embodiments of the present invention can be extended and applied to a case that a base station indicates whether to (re)transmit uplink control/data received from a UE in i) a system to which a carrier aggregation (CA) scheme is applied and/or ii) a system to which a self-scheduling scheme is applied under CA environment and/or iii) a system to which a cross carrier scheduling (CCS) scheme is applied under CA environment and/or iv) a FDD system and/or v) a TDD system and/or vi) a system of which TDD bandwidth and a FDD bandwidth are aggregated with each other by a CA scheme and/or vii) a system of which new carrier type (NCT) is aggregated by a CA scheme and the like.

And, the embodiments of the present invention can be extended and applied to indicate whether a transmitting UE (re)transmits control/data to a receiving UE under a situation that inter-UE communication (e.g., D2D communication/communication between UE and relay) is performed.

Configuration of DCI Format Related Uplink (Re)Transmission

As an embodiment of the present invention, a base station can be configured to inform a UE of information on whether to (re)transmit uplink control/data (received from the UE) in a format of a new form defined in advance. In particular, if i) transmission of PHICH and/or EPHICH is not (successfully) secured, ii) transmission of PHICH and/or EPHICH is not performed, iii) fast link adaptation of uplink communication is required, the information on whether to (re)transmit the uplink control/data can be effectively used. And, it is apparent that the present invention is usable for efficiently implementing (E)PHICH in a i) search space (SS) (e.g., a common search space (CSS) or a specific region of a UE-specific search space (USS)) in which control information (e.g., EPDCCH, PDCCH) is transmitted, ii) a specific region of PDSCH in which data/control information is transmitted or iii) a predetermined specific resource region. For instance, the information on whether to (re)transmit the uplink control/data received from the UE can be transmitted via a DCI format of a new form defined in advance. The DCI format may have a form different from a form of a legacy PHICH/EPHICH/uplink DCI format/downlink DCI format. And, the DCI format of the new form can be configured to be restrictively transmitted on the UE-specific search space (or the common search space) only.

In the following, concrete characteristics (structure/configuration) for a DCI format of a new form are explained according to the present invention.

According to the present invention, information on whether to (re)transmit uplink control/data of a UE can be configured by a form of a legacy field and/or a form of a new field in a DCI format of a new form. For instance, if the information on whether to (re)transmit the uplink control/data of the UE is implemented by the form of the legacy field, it may be able to (re)use a new data indicator (NDI) field to inform a UE of the information on whether to (re)transmit the uplink control/data and it may be able to configure retransmission to be determined according to whether the NDI field is toggled or not. Or, if the information on whether to (re)transmit the uplink control/data of the UE is implemented by the form of the new field, it may be able to define an identifier (RNTI) information field of a UE to indicate the information on whether to (re)transmit the uplink control/data. In this case, it may be able to configure retransmission of the uplink control/data to be performed only when the UE detects (or blind decoding) the DCI format of the new form and there exists identifier information of the UE.

In addition, not only the information on whether to (re)transmit the uplink control/data but also information on an uplink HARQ process index in which retransmission is performed can be transmitted on the DCI format of the new form. Or, it may be able to configure a UE or base station to implicitly deduct the information on the uplink HARQ process index in which retransmission is performed based on an uplink HARQ timeline without transmitting the information on the uplink HARQ process index in which the retransmission of the uplink control/data is performed.

And, according to the present invention, it may be able to configure not only the information on whether to (re)transit the uplink control/data of the UE but also predefined information of various usages to be transmitted together via the DCI format of the new form. For instance, information related to fast link adaptation of the uplink control/data (re)transmission can be defined to be additionally transmitted. To this end, it may be able to transmit i) modulation & coding scheme (MCS) information on the uplink control/data (re)transmission and/or ii) transmit power control (TPC) information and/or iii) precoding information and/or iv) information on the number of layers and/or v) DM-RS cyclic shift & OCC index information and the like together with the information on whether to (re)transmit the uplink control/data. Hence, when the predefined additional information is transmitted together with the information on whether to (re)transmit the uplink control/data, if load of downlink communication increases under environment in which a radio usage is dynamically changing according to a system load status (i.e., in a situation that the number of UEs intending to perform uplink communication is relatively small), it may be able to efficiently perform uplink control/data retransmission to which the fast link adaptation is applied.

And, according to the present invention, (all or a part of) information (e.g., resource block assignment & hopping resource allocation information) related to the uplink control/data (re)transmission, which is not transmitted/updated by the DCI format of the new form, can be configured to follow scheduling information on initial uplink control/data transmission of the UE or scheduling information on most recent uplink control/data (re)transmission of the UE. For instance, the scheduling information on the initial uplink control/data transmission of the UE can be restricted to information interlocked with a specific uplink HARQ process/timeline, which is determined to be retransmitted based on the DCI format of the new form. Similarly, the scheduling information on the most recent uplink control/data (re) transmission (of the UE) can also be restricted by information interlocked with a specific uplink HARQ process/timeline, which is determined to be retransmitted based on the DCI format of the new form.

And, according to the present invention, a total payload size of information transmitted via the DCI format of the new form can be defined by a value relatively smaller than a DCI format (e.g., DCI format 0/4) in which the scheduling information on the initial uplink control/data transmission of the UE is transmitted and/or a DCI format in which the scheduling information on the most recent uplink control/data (re)transmission is transmitted. This is because, as mentioned in the foregoing description, (all or a part of) the information on the uplink control/data (re)transmission, which is not transmitted/updated by the DCI format of the new form, can be configured to follow scheduling information on previous uplink control/data transmission. In doing so, it may be able to configure information essential for a predefined purpose (e.g., the information on whether to (re)transmit uplink control/data, the information on fast link adaptation of uplink control/data (re)transmission and the like) to be transmitted in the DCI format of the new format only.

Or, according to the present invention, a (lastly transmitted) payload size of the DCI format of the new form can be defined by a value identical to a value of a payload size of a specific DCI format (e.g., DCI format 0/4) in which scheduling information on a legacy uplink control/data transmission is transmitted, a value identical to a value of a payload size of a specific DCI format (e.g., DCI format 1A) in which scheduling information on a legacy downlink control/data transmission is transmitted, or a value identical to a value of a payload size of a specific DCI format (e.g., DCI format 1C) in which scheduling information on a legacy system information/paging information/random access information transmission is transmitted. By doing so, increase of the number of performing blind decoding (BD), which is additionally performed by a UE on the DCI format of the new form (of a payload size different from a payload size of a legacy DCI format), can be avoided.

And, according to the present invention, in order to prevent additional increase of the number of performing blind decoding (on a search space) of a UE performed on the DCI format of the new form, the DCI format of the new form can be configured to be positioned at the search space (SS) in a form of borrowing a part of blind decoding candidates (i.e., the number of EPDCCH candidates) of a relatively low aggregation level (AL) of a predefined (legacy) specific DCI format. For instance, the DCI format of the new form can be configured to be positioned at the search space in a form of borrowing a part of the blind decoding candidates of a relatively low aggregation level (e.g., AL $\{1, 2\}$ among AL $\{1, 2, 4, 8\}$) of a legacy DCI format 4. On the contrary, the DCI format of the new form can be configured to be positioned at the search space in a form of borrowing a part of the blind decoding candidates of a relatively high aggregation level (e.g., AL $\{4, 8\}$ among AL $\{1, 2, 4, 8\}$) of a predefined (legacy) specific DCI format.

And, according to the present invention, the DCI format of the new form can be configured to be transmitted based on a predefined radio resource base unit and/or a radio resource amount. In this case, the radio resource base unit used for transmitting the DCI format of the new form can be defined as identical to a CCE unit used for transmitting legacy PDCCH/PHICH or an ECCE unit used for transmitting EPDCCH/EPHICH. Yet, in some cases, the radio resource base unit used for transmitting the DCI format of the new form can be defined as different from the CCE unit used for transmitting legacy PDCCH/PHICH or the ECCE unit used for transmitting EPDCCH/EPHICH. If a radio resource base unit different from the legacy radio resource base unit is defined to transmit the DCI format of the new form, (for instance), a radio resource base unit consisting of (E)REG/RE/(E)CCE of newly defined numbers can be used to transmit the DCI format of the new form.

And, according to the present invention, the DCI format of the new form can be configured to be transmitted by a predefined specific aggregation level (AL) value. For instance, the DCI format of the new form can be configured to be transmitted by a relatively low aggregation level value. In particular, although the relatively low aggregation level value is applied to transmit the DCI format of the new form defined by a relatively small payload size, it may be able to achieve a sufficiently low coding rate and may be able to lower probability (i.e., blocking probability) incapable of performing uplink/downlink DCI transmission in the search space (SS) due to the transmission of the DCI format of the new form. On the contrary, the DCI format of the new form can be configured to be transmitted by a high AL value. In particular, if a relatively high aggregation level value is applied to transmit the DCI format of the new form, it may be able to increase a reception success rate of the DCI format. Moreover, a base station can inform a UE of configuration information on a specific aggregation level applied to the DCI format of the new form via a predefined signal (e.g., a physical layer signal or a higher layer signal). Or, it may be able to configure the UE to implicitly identify the information based on a predefined rule/configuration.

And, according to the present invention, the DCI format of the new form can be configured to be transmitted via a predefined radio resource of a fixed position or a radio resource position varying according to a predefined rule/configuration. For instance, the radio resource position in which the DCI format of the new form is transmitted may correspond to a radio resource position of a search space on which control information (e.g., EPDCCH, PDCCH) are transmitted or a radio resource position of PDSCH on which data/control information is transmitted.

In this case, in case of transmitting the DCI format of the new form via a radio resource position varying based on a predefined rule, the radio resource position of the DCI format of the new form, which is transmitted at a timing of a specific subframe, can be defined by a predefined function including a lowest index among resource block (RB) indexes used for (re)transmitting most recent uplink control/data as an input variable (or parameter). Or, the radio resource position of the DCI format of the new form, which is transmitted at a timing of a specific subframe, can be defined via a predefined function including a lowest index among resource block (RB) indexes used for transmitting initial uplink control/data as an input variable (or parameter). In this case, the function determining the radio resource position in which the DCI format of the new form is transmitted can be defined to have at least one selected from the group consisting of an identifier (RNTI) of a UE, a (physical/virtual) identifier of a cell, a subframe index and a slot index as an input variable (or a parameter).

And, in case of transmitting the DCI format of the new form via a predefined radio resource of a fixed position, a base station may inform a UE of information on the radio resource of the fixed position in which the DCI format of the new form is transmitted via a predefined signal (e.g., a physical layer signal or a higher layer signal). Or, it may be able to configure a UE to implicitly identify the information based on a predefined rule.

Uplink (Re)Transmission-Related DCI Format Configuration in Consideration of a Plurality of UEs In the following, a method of simultaneously transmitting information on whether uplink control/data is (re)transmitted to each of a plurality of UEs via the DCI format of the new form is explained based on the aforementioned new DCI format-related configuration of the present invention. And, the DCI format of the new form can be configured to be transmitted to a common search space (or a UE-specific search space) only.

For example, in order to inform each of the predefined number of UEs of information on whether uplink control/data is (re)transmitted, it may be able to define UE identifier (RNTI) information fields as many as the predefined number of UEs on the DCI format of the new form. In this case, a UE detects (or blind decoding) the DCI format of the new form and can be configured to perform retransmission of uplink control/data based on received relevant information only when identifier information of the UE exists in the DCI format. As a different example, in order to inform each of the predefined number of UEs of information on whether the uplink control/data is (re)transmitted, UE identifier (RNTI) information fields as many as the predefined number of UEs and information fields (e.g., NDI field) indicating whether the uplink control/data is (re)transmitted can be defined on the DCI format of the new form. Moreover, the information on whether the uplink control/data is (re)transmitted to each of the predefined number of UEs can be configured to be transmitted together with information of various usages additionally defined in advance.

Figure 11:
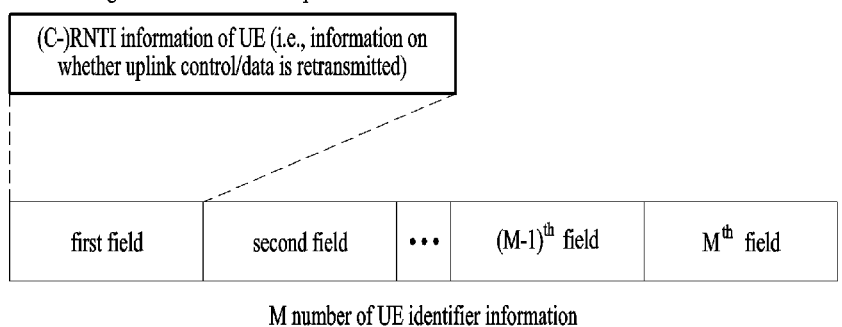
FIGS. 11 and 12 are diagrams for an example of configurations of a DCI format according to embodiments of the present invention.

FIG. 11 shows a case that information on whether uplink control/data is (re)transmitted to each of the predefined number of UEs is transmitted via a DCI format of a new form.

Referring to FIG. 11, it is assumed that information on whether uplink control/data is (re)transmitted to each of the predefined number (e.g., M is a natural number) of UEs are transmitted via UE identifier (RNTI) information fields of the corresponding (i.e., predefined) number defined on the DCI format of the new form according to the present invention. Each of the UEs detects (or blind decoding detection) the DCI format of the new form and performs uplink control/data retransmission based on received relevant information only when identifier information of each UE exists in the DCI format.

And, a base station can be configured to inform a specific UE of information on a field position in which information on whether uplink control/data related to the specific UE is (re)transmitted is transmitted in the DCI format of the new form via a predefined signal. For instance, the field can be implemented by i) UE identifier (RNTI) information field or ii) the UE identifier (RNTI) information field and information fields (e.g., NDI field) indicating whether uplink control/data is (re)transmitted interlocked with the UE identifier (RNTI) information field. Hence, if a specific field position is indicated, it may be able to reduce i) information indicating whether uplink control/data is (re)transmitted of a specific UE and/or ii) detection error probability (i.e., false alarm) for UE identifier information.

Or, it may be able to configure a UE to implicitly identify information on whether uplink control/data of the UE is (re)transmitted and/or information on a field position in which UE identifier information is transmitted based on a predefined function (without field position information directly transmitted by a base station). For instance, in order to identify the aforementioned information on the field position, the predefined function can be defined as "(UE identifier) MODULO (the total number of fields in which the information on whether uplink control/data is (re)transmitted on the new DCI format)". In this case, 'the fields in which the information on whether the uplink control/data is (re)transmitted on the new DCI format' may correspond to i) UE identifier (RNTI) information field or ii) the UE identifier (RNTI) information field and information fields indicating whether uplink control/data is (re)transmitted interlocked with the UE identifier (RNTI) information field. In this case, in case of the ii), a specific UE identifier information field and a field indicating whether uplink control/data is (re)transmitted interlocked with the specific UE identifier information field can be considered as a single field. Or, the predefined function can be defined as "(UE identifier) MODULO (a group index informed to a UE via predefined signal by a base station)" or "(UE identifier) MODULO (total number of group indexes informed to a UE via a predefined signal by a base station) and the like. In this case, the total number of group indexes can be defined by a value identical to the total number of fields in which information on whether the uplink control/data is (re)transmitted is transmitted in the new DCI format.

Uplink (Re)Transmission-Related DCI Format Configuration in Consideration of a Plurality of UE Groups Information transmitted via a field of the DCI format of the new form can be defined to simultaneously represent information on whether uplink control/data for a plurality of UEs are (re)transmitted in a manner of extending and applying the aforementioned present invention. In this case, one of predefined UE group identifiers (IDs) is transmitted in the field. Or, a group identifier and information on whether uplink control/data is (re)transmitted interlocked with the group identifier can be transmitted in the field. A UE detects (or blind decoding) the DCI format of the new form and can be configured to perform uplink control/data retransmission based on received relevant information only when there exist group identifier information assigned to the UE. In particular, a plurality of UEs interlocked with the group identifier perform the uplink control/data retransmission at the same time. If the present invention is applied to a plurality of UE groups, it is able to commonly inform a specific UE group of information on whether uplink control/data is retransmitted. By doing so (e.g., as shown in FIG. 11), it may be able to reduce overhead for a plurality of UE identifier (RNTI) information transmitted on the DCI format of the new form and/or overhead for information on whether a plurality of uplink control/data are retransmitted. And, the DCI format of the new form can be configured to be transmitted on a common search space (or UE-specific search space) only.

In this case, a base station can inform a UE of information on UEs interlocked with a specific group identifier via a predefined signal. Or, it may be able to configure a UE to implicitly identify the information based on a predefined rule/configuration. For instance, the predefined rule can be defined as "(UE identifier) MODULO (the total number of fields in which the information on whether uplink control/data is (re)transmitted in the new DCI format)". In this case, 'the fields in which the information on whether the uplink control/data is (re)transmitted in the new DCI format' may correspond to i) UE identifier (RNTI) information field or ii) the UE identifier (RNTI) information field and information fields indicating whether uplink control/data is (re)transmitted interlocked with the UE identifier (RNTI) information field. In this case, in case of the ii), a specific UE identifier information field and a field indicating whether uplink control/data is (re)transmitted interlocked with the specific UE identifier information field can be considered as a single field. Or, the predefined rule can be defined as "(UE identifier) MODULO (total number of group indexes informed to a UE via a predefined signal by a base station).

And, according to the present invention, UE groups interlocked with group identifier information, which is transmitted via a field of the DCI format of the new form, can be configured to perform a non-adaptive retransmission-based uplink control/data retransmission operation. In this case, the UE groups performing the non-adaptive retransmission operation can be configured to perform the retransmission operations based on scheduling information on initial uplink control/data transmission of each of the UE groups. Or, the UE groups performing the non-adaptive retransmission operation can be configured to perform the retransmission operations based on scheduling information on most recent uplink control/data transmission. Moreover, in a situation that a non-adaptive retransmission operation is applied to the UE groups interlocked with the group identifier information, 'resource collision of uplink control/data retransmissions between UEs' or 'resource collision of information on whether uplink control/data is retransmitted between UEs' can be avoided by adjusting/controlling scheduling information (according to a UE) adjusted/controlled by a base station.

Among UEs interlocked with the group identifier information, which is transmitted via the field of the DCI format of the new form, UEs (practically) performing the uplink control/data retransmission performs previous uplink control/data (re)transmission in a manner of including a predefined value (e.g., 4 ms) from timing of receiving the DCI format of the new form. In relation to this, the UEs performing the uplink control/data retransmission can be restricted to UEs not receiving the information on whether to perform retransmission and/or UEs including currently not terminated uplink HARQ processes.

Figure 12:
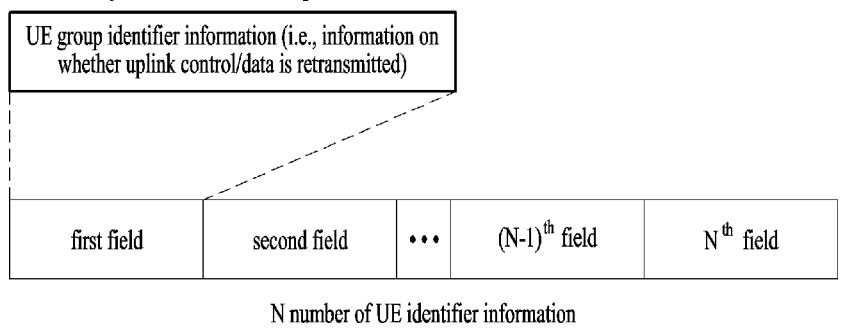

FIG. 12 shows a case that information transmitted via a field of the DCI format of the new form simultaneously represents information on whether uplink control/data is (re)transmitted to a plurality of UEs.

Referring to FIG. 12, when N (the number of predefined UE groups (e.g., N is a natural number)) number of fields are configured to the DCI format of the new form, it is assumed that one of predefined (UE) group identifiers (IDs) is transmitted in the field. An individual UE detects (or blind decoding) the DCI format of the new form and can perform retransmission of the uplink control/data based on received uplink control/data retransmission-related information only when there exists (UE) group identifier information assigned to the individual UE in the DCI format.

And, according to the present invention, it may also be defined as a field of a specific position of the DCI format of the new form simultaneously represents the information on whether the uplink control/data is (re)transmitted to a plurality of the UEs. In this case, a base station can inform a UE of information on a UE group interlocked with the field of the specific position via a predefined signal or it may be able to configure a UE to implicitly identify the information based on a predefined rule.

And, a value of the field of the specific position can be configured to be determined by logical AND/OR calculation of information on whether uplink control/data is retransmitted of UEs belonging to a UE group interlocked with the field. Or, the value of the field of the specific position can also be configured to be determined by logical AND/OR calculation of ACK/NACK information on whether the uplink control/data is (re)transmitted. In particular, if the value of the field of the specific position indicates to retransmit the uplink control/data, all of UE groups interlocked with the field of the position perform retransmission of the uplink control/data.

And, according to the present invention, if the field value of the specific position indicates to retransmit the uplink control/data, (all of) the UE groups interlocked with the field of the position can be configured to perform an operation of retransmitting non-adaptive retransmission-based uplink control/data. For instance, the UE groups performing the non-adaptive retransmission operation can be configured to perform the retransmission operation based on scheduling information on initial uplink control/data transmission of each of the UE group. Or, the UE groups performing the non-adaptive retransmission operation can be configured to perform the retransmission operation based on scheduling information on most recent uplink control/data transmission. Additionally, according to the present invention, if the field value of the specific position indicates to retransmit the uplink control/data, among UEs interlocked with the field of the specific position, UEs (practically) performing the uplink control/data retransmission perform previous uplink control/data (re)transmission in a manner of including a predefined value (e.g., 4 ms) from timing of receiving the DCI format of the new form. In relation to this, the UEs performing the uplink control/data retransmission can be restricted to UEs not receiving the information on whether to perform the retransmission and/or UEs including currently not terminated uplink HARQ processes.

And, according to the present invention, a position of a radio resource in which the DCI format of the new form is transmitted can be selected from one of points at which positions of blind decoding candidates are overlapped between a plurality of UEs on a search space on which control information (e.g., EPDCCH, PDCCH) are transmitted. Hence, if information on whether the uplink control/data is (re)transmitted are transmitted (at the same time) to a plurality of the UEs via the DCI format of the new form, it may be able to efficiently configure resources on the search space (SS). In particular, if a plurality of the UEs perform a detection operation on blind decoding candidates of an identical position on the search space (SS), a plurality of the UEs can identify the information on whether the uplink control/data is (re)transmitted.

And, it may be able to restrict the information on whether the uplink control/data is (re)transmitted to be transmitted to a single UE via the DCI format of the new form. By doing so, it may be able to efficiently reduce a payload size of the DCI format of the new form.

And, according to the present invention, the DCI format of the new form can be configured to be transmitted via a common search space (CSS) or a UE-specific search space (USS). For instance, if the DCI format of the new form is transmitted via the CSS, it may be able to configure a plurality of UEs (or UE groups) to perform an operation of detecting the DCI format of the new form or an operation of verifying a CRS based on a predefined common RNTI information or individual RNTI information. And, if the DCI format of the new form is transmitted via the USS, it may be able to configure an individual UE of a plurality of the UEs to perform the operation of detecting the DCI format of the new form or the operation of verifying a CRS based on RNTI information of the individual UE. Or, it may be able to configure a plurality of the UEs (or UE group) to perform the operation of detecting the DCI format of the new form or the operation of verifying a CRS based on predefined common RNTI information. Moreover, a base station can inform a UE of the common RNTI information used for the operation of detecting the DCI format of the new form transmitted via the CSS/USS or the operation of verifying a CRS and information on configuration of a UE group interlocked with the common RNTI information via a predefined signal. Or, it may be able to configure a UE to implicitly identify the information based on a predefined rule.

And, according to the present invention, the DCI format of the new form can be configured to be applied only when i) scheduling information on initial uplink control/data transmission or scheduling information on most recent uplink control/data transmission is transmitted via a predefined DCI format and/or ii) a predefined uplink transmission mode (TM) is configured. For instance, the DCI format of the new form can be configured to be applied only when the scheduling information on initial uplink control/data transmission or the scheduling information on most recent uplink control/data transmission is transmitted via a DCI format 4 including a relatively big payload size and/or an uplink MIMO transmission mode requiring relatively great amount of scheduling information is configured. Moreover, a base station can inform a UE of information on specific conditions to which the DCI format of the new form is applied via a predefined signal (e.g., a physical layer signal or a higher layer signal). Or, it may be able to configure a UE to implicitly identify the information based on a predefined rule.

And, according to the present invention, the DCI format of the new form can be configured to be restrictively applied only when uplink-downlink configuration (e.g., UL-DL configuration #0) of which a configuration ratio of uplink subframes is relatively high is designated in TDD system environment. In this case, a base station can inform a UE of information on uplink-downlink configurations to which the DCI format of the new form is applied and/or threshold information on the configuration ratio of uplink subframes via a predefined signal.

And, according to the present invention, timing of transmitting the DCI format of the new form can be configured in a manner of being different from a timeline of a specific uplink HARQ process, which is determined to be retransmitted via the DCI format of the new form (e.g., for the purpose of efficient link adaptation operation). For instance, although timing of retransmitting uplink control/data may follow the timeline of the specific uplink HARQ process, which is determined to be retransmitted via the DCI format of the new form, as it is, the timing of transmitting the DCI format of the new form can be defined by timing appearing before the timing of retransmitting the uplink control/data as much as a predefined value (e.g., 4 ms). Moreover, a base station can inform a UE of information on the timing of transmitting the DCI format of the new form via a predefined signal (e.g., a physical layer signal or a higher layer signal). Or, it may be able to configure a UE to implicitly identify the information based on a predefined rule.

And, according to the present invention, the DCI format of the new form can be configured to be transmitted on a search space in which control information (e.g., EPDCCH, PDCCH) are transmitted based on a predefined specific transmission type. For instance, the DCI format of the new form can be configured to be transmitted on the search space in which the control information (e.g., EPDCCH, PDCCH) are transmitted based on a localized transmission type or a distributed transmission type (e.g., a sort of EPDCCH transmission type). Moreover, a base station can inform a UE of information on the DCI format of the new form via a predefined signal (e.g., a physical layer signal or a higher layer signal). Or, it may be able to configure a UE to implicitly identify the information based on a predefined rule.

And, the DCI format of the new form can be configured to be detected (or decoded) based on i) a predefined reference signal and/or ii) antenna port configuration of a reference signal and/or iii) scrambling (sequence) configuration. In this case, if the DCI format of the new form is transmitted on a search space (SS) in which EPDCCH is transmitted, the DCI format of the new form can be configured to be detected (or decoded) based on a DM-RS.

Figure 13:
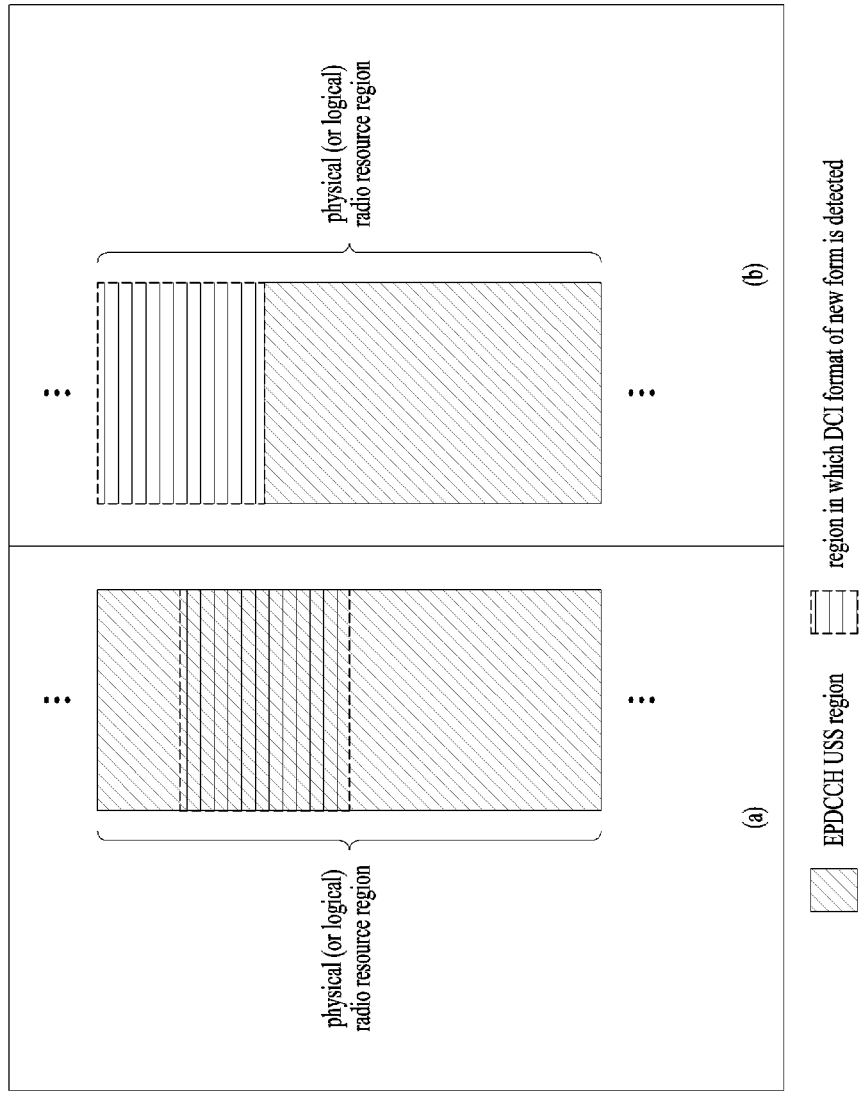
FIG. 13 is a diagram for an example of a radio resource region in which a DCI format is transmitted according to the present invention.

FIG. 13 is a reference drawing for explaining a radio resource region in which a DCI format of a new form is transmitted (or detected).

As shown in FIG. 13, according to the present invention, it may be able to independently (re)define a radio resource region or a specific region of a search space (SS) to detect the DCI format of the new form. In this case, as shown in FIG. 13 (a), the radio resource region in which the DCI format of the new form is transmitted (or detected) can be configured by a part of radio resource regions of a UE-specific search space (USS) in which control information (e.g., EPDCCH) are transmitted. Or, as shown in FIG. 13 (b), the radio resource region in which the DCI format of the new form is transmitted (or detected) can be configured by a radio resource region independent from the radio resource regions of the USS in which the control information are transmitted.

And, in FIG. 13, a radio resource region can be interpreted as a physical resource region or a logical resource region. Moreover, detection of the DCI format of the new form can be configured to be performed based on a legacy C-RNTI of a UE or a newly (i.e., independently) defined RNTI (e.g., EPHICH-RNTI). For instance, the newly (i.e., independently) defined RNTI (e.g., EPHICH-RNTI) can be defined by a value independent according to a UE or a value independent according to a (predefined) UE group (i.e., UEs belonging to an identical UE group have a common value). Specifically, an individual UE (or UE group) performs a detection (blind decoding) operation in a radio resource region (e.g., a radio resource region shown in FIG. 13 (a) or (b)) in which the DCI format of the new form is transmitted based on an RNTI for detecting the DCI format of the new form.

And, according to the present invention, when the DCI format of the new form is transmitted (or detected) via a specific region of an independent radio resource or a specific region of a search space (SS), it may be able to configure to borrow the count of blind decoding assigned to a legacy USS in order to avoid increase of the additional count of blind decoding of a UE for the detection of the DCI format of the new form or maintain the maximum count of blind decoding of the UE. In this case, in case of borrowing the count of blind decoding assigned to the legacy USS to detect (blind decoding) the DCI format of the new form, it is necessary to configure the count of blind decoding related to a (legacy) DCI format to be borrowed. In particular, embodiment of the present invention can be interpreted as a form of securing the count of blind decoding for detecting the DCI format of the new form while the count of blind decoding related to the (legacy) DCI format, which is transmitted in USS, is reduced to detect the DCI format of the new form.

For instance, in order to detect (blind decoding) the DCI format of the new form, it may be able to configure to borrow a part of the count of blind decoding of a relatively low aggregation level (e.g., AL $\{1, 2\}$ among AL $\{1, 2, 4, 8\}$) of a predefined specific DCI format (e.g., DCI format 4 or DCI format 0/1A) or a specific DCI format series (e.g., DCI format 2 series or DCI format 1 series). Or, on the contrary, in order to detect (blind decoding) the DCI format of the new form, it may be able to configure to borrow a part of the count of blind decoding of a relatively high aggregation level (e.g., AL $\{4, 8\}$ among AL $\{1, 2, 4, 8\}$) of a predefined specific DCI format (e.g., DCI format 4 or DCI format 0/1A) or a specific DCI format series (e.g., DCI format 2 series or DCI format 1 series). Or, it may be able to configure to borrow a part of the count of blind decoding of a specific aggregation level or a half of the count of blind decoding of all aggregation levels based on a predefined weight.

Specifically, if the DCI format of the new form is transmitted via a specific region of a predefined independent radio resource (or a specific region of a search space) and a random UE group performs detection of the DCI format of the new form at specific timing, all UEs belonging to the group borrow the count of blind decoding of a specific DCI format transmitted in a legacy USS according to a predefined configuration and may be able to detect the DCI format of the new form. For instance, the UEs belonging to the random UE group can detect the DCI format of the new form based on RNTI information predefined according to a UE group or C-RNTI information of an individual UE (in a manner of borrowing the count of blind decoding of the specific DCI format transmitted in the legacy USS).

Figure 14:
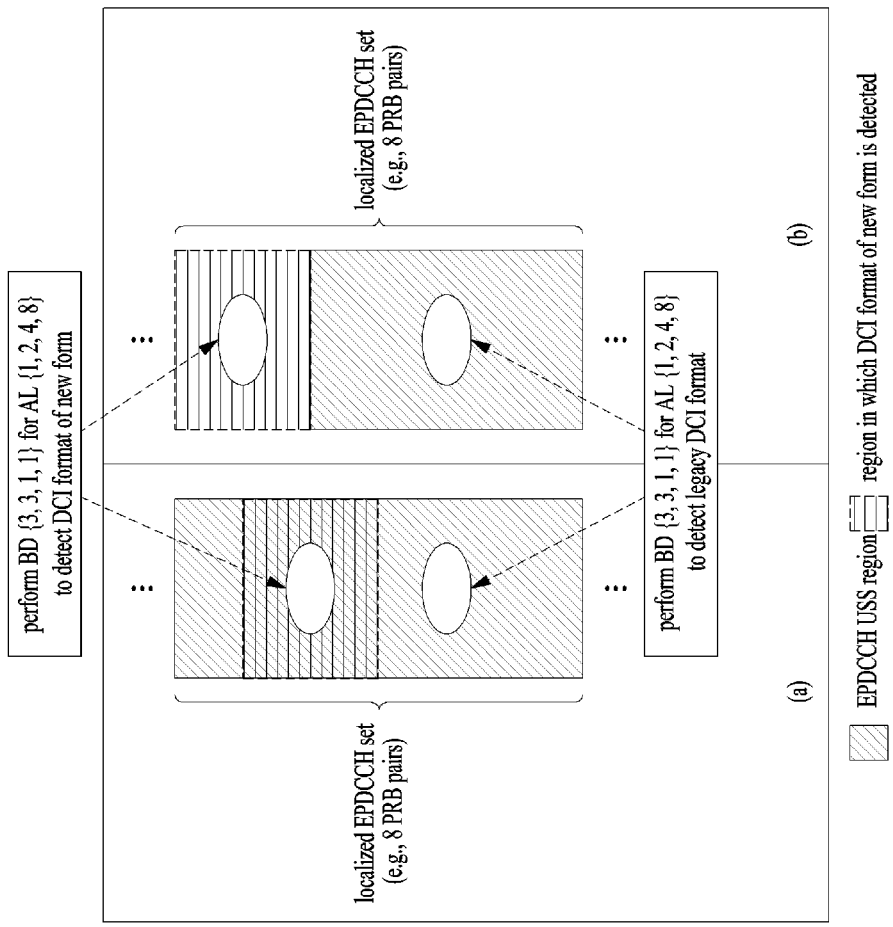
FIG. 14 is a diagram for an example of reassigning the number of performing blind decoding of a specific DCI format according to the present invention.

FIG. 14 is a reference drawing for explaining a case of performing detection of a DCI format of a new form in a manner of borrowing the count of blind decoding of a specific DCI format transmitted in a legacy USS according to a predefined configuration.

In FIG. 14, assume a situation that 1 localized EPDDCCH set is configured and the localized EPDCCH set includes 8 PRB pairs. Under this assumption, a UE should perform monitoring according to the count of blind decoding (BD) $\{6, 6, 2, 2\}$ for aggregation level $\{1, 2, 4, 8\}$ to detect a (legacy) DCI format in a USS of the localized EPDCCH set. Yet, it may be able to assume that the UE borrows a part of the count of blind decoding related to the (legacy) DCI format (e.g., DCI format 0/1A) based on a predefined rule to detect a DCI format of a new form. In particular, the count of blind decoding $\{3, 3, 1, 1\}$ for aggregation levels $\{1, 2, 4, 8\}$ corresponding to a part of the count of blind decoding related to the (legacy) DCI format can be used for detecting the DCI format of the new form.

Hence, as shown in FIG. 14 (a), if a region in which a DCI format of a new form is detected is configured by a part of radio resource regions of UE-specific search space (USS) in which control information (e.g., EPDCCH) are transmitted, an operation of detecting the DCI format of the new form is performed in the region according to the count of blind decoding $\{3, 3, 1, 1\}$ for aggregation levels $\{1, 2, 4, 8\}$. As shown in FIG. 14 (b), if a region in which a DCI format of a new form is detected is configured by a radio resource region independent of the radio resource regions of the USS in which the control information are transmitted, an operation of detecting the DCI format of the new form is performed in the region according to the count of blind decoding $\{3, 3, 1, 1\}$ for aggregation levels $\{1, 2, 4, 8\}$.

And, according to the present invention, a base station can inform a UE of a payload size of the DCI format (or EPHICH) of the new form or a final length (e.g., payload+ CRC+channel coding+rate matching (i.e., amount of bits actually transmitted in a physical resource region)) of the DCI format (or EPHICH) via a predefined signal (e.g., a physical layer signal or a higher layer signal). Or, the payload size of the DCI format of the new form or the final length of the DCI format can be configured to have network configurability characteristic.

In addition, if the payload size of the DCI format (or EPHICH) of the new form or the final length of the DCI format (or EPHICH) is configured by a predefined fixed value, it may be able to define a rule of indicating a total number of actually used (configured) fields to enable a base station to inform a UE of information on whether uplink control/data is (re)transmitted to a plurality of UEs (or a plurality of UE groups) on the DCI format (or EPHICH) via a predefined signal (e.g., a higher layer signal or a physical layer signal). In this case, remaining bits resulted from excluding the total bits of the actually used fields from the payload size of the DCI format (or EPHICH) of the new form or the final length of the DCI format (or EPHICH) can be defined by a predefined or signaled fixed value (e.g., zero padding). Bits of the fixed value can be used as a virtual CRC.

And, in the payload size of the DCI format (or EPHICH) of the new form, a bit configured by a predefined or signaled fixed value (e.g., zero padding) can be defined by MOD (X, Y). In this case, the MOD (X, Y) indicates Modulo calculation (remainder of division of X by Y). The X indicates i) the payload size of the DCI format (or EPHICH) of the new form or ii) the final length of the DCI format (or EPHICH) and the Y indicates a length of a predefined field (a field in which information on whether uplink control/data is (re)transmitted is transmitted). For instance, bits in the back of the DCI format corresponding to the MOD (a payload size of the DCI format of the new form, a length of a predefined field) can be implicitly configured by a predefined (or signaled) fixed value (e.g., zero padding).

And, in the aforementioned embodiments of the present invention, a search space function (or hashing function) for detecting the DCI format of the new form (or EPHICH) can be defined in a manner of being independent of (e.g., different from) a search space function (or hashing function) for detecting control information on a legacy USS/CSS. For instance, a UE can perform a detection operation using the independently defined searching space function (or hashing function) to detect the DCI format (or EPHICH) of the new form in a (predefined) resource region in which the DCI format (or EPHICH) of the new form is transmitted.

The aforementioned embodiments of the present invention can also be applied to a case that the DCI format of the new form is transmitted via a part of radio resource regions of a common search space (CSS) or a radio resource region independent of the radio resource regions of the CSS.

And, the aforementioned embodiments of the present invention can be configured to be restrictively applied only when at least one selected from the group consisting of i) a case of using a predefined new (i.e., independent) RNTI (e.g., EPHICH-RNTI) to detect the DCI format of the new form, ii) a case of transmitting (detecting) the DCI format of the new form via USS/CSS, iii) a case of receiving information (e.g., (E)PHICH information) on whether uplink data (PUSCH) transmitted in previous timing is successful based on uplink HARQ timeline, iv) a case of configuring a specific uplink transmission mode (TM) (or a downlink transmission mode), v) a case of configuring a specific system bandwidth value, vi) a case of performing uplink data transmission based on a specific DCI format (e.g., DCI format 4), vii) a case of configuring a specific CP (e.g., normal CP, extended CP)/specific subframe type (e.g., normal subframe, special subframe)/specific special subframe, viii) a case that the number of REs usable for transmitting EPDCCH in a single PRB pair is equal to or greater than a predefined value, ix) a case that the number of REs usable for transmitting EPDCCH in a single PRB pair is less than a predefined value are satisfied.

And, the aforementioned embodiments of the present invention can be configured to be restrictively applied to a specific retransmission scheme among an adaptive retransmission scheme and a non-adaptive retransmission scheme. Or, if the embodiment of the present invention is applied, it may be able to configure a specific retransmission scheme to be applied only. And, if carrier aggregation scheme is applied, a common search space mentioned in the present invention can be interpreted as a common search space on a primary cell (or a primary component carrier).

It is apparent that each of the aforementioned embodiments/configurations/rules/examples of the present invention can be considered as an independent proposed scheme. And, although the aforementioned embodiments/configurations of the present invention can be independently implemented, a part of the proposed schemes can be implemented in a manner of being combined (aggregated) with each other.

And, a base station can inform a UE of information on the rules/configurations/embodiments proposed by the aforementioned embodiments of the present invention or information on whether the rules/configurations/embodiments are applied via a predefined signal (e.g., a physical layer signal or a higher layer signal).

In the aforementioned embodiment of the present invention, a DCI format of a new form designed to indicate information on whether uplink control/data is (re)transmitted can be considered as a sort of a UL grant form of a small payload size (e.g., "short UL grant").

The aforementioned embodiments of the present invention can be configured to be restrictively applied only when a communication scheme of a predefined type is configured. For instance, the aforementioned embodiments of the present invention can be configured to be restrictively applied only when inter-UE communication (e.g., D2D communication/communication between UE and relay) is performed. In this case, it may be able to additionally use configuration fields of the DCI format of the new form to transmit information on the inter-UE communication (e.g., D2D communication/communication between UE and relay). And, a specific cell can inform UEs communicating with the specific cell of information on whether a specific communication scheme is configured via a predefined signal (e.g., a physical layer signal or a higher layer signal (e.g., RRC/MAC) or a system information transmission channel (e.g., SIB/PBCH (MIB)/paging)).

The aforementioned embodiments of the present invention can be configured to be restrictively applied only when the DCI format of the new form is transmitted via CSS/USS.

And, the aforementioned embodiments of the present invention can be configured to be restrictively applied only when transmission of a legacy PDCCH channel and/or a legacy PHICH channel is unable to be implemented (e.g., new carrier type, NCT).

Figure 15:
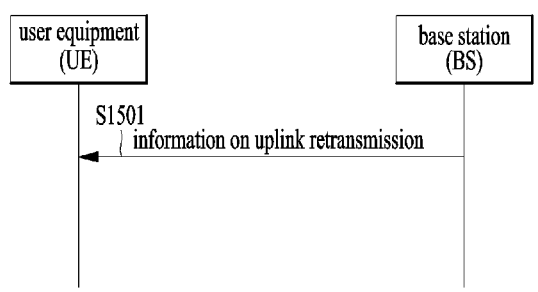
FIG. 15 is a flowchart for a method of transmitting and receiving a signal according to a preferred embodiment of the present invention.

FIG. 15 is a flowchart for a method of transmitting and receiving control information according to a preferred embodiment of the present invention.

Referring to FIG. 15, a user equipment (UE) receives information on uplink retransmission, e.g., information on whether uplink control/data is retransmitted and information on a UE(s) performing the retransmission, from a base station (BS) [S1501]. In particular, in the step S1501, the information on the uplink retransmission/configuration/rule can be configured according to the aforementioned embodiments of the present invention. In some cases, the information on the uplink retransmission/configuration/rule can be determined by a combination of at least a part of the aforementioned embodiments of the present invention.

The method of performing uplink retransmission according to the present invention mentioned earlier with reference to FIG. 15 can be performed in a manner of independently applying items explained in the aforementioned various embodiments of the present invention or applying two or more embodiments at the same time. For clarity, explanation on overlapped contents is omitted at this time.

Figure 16:
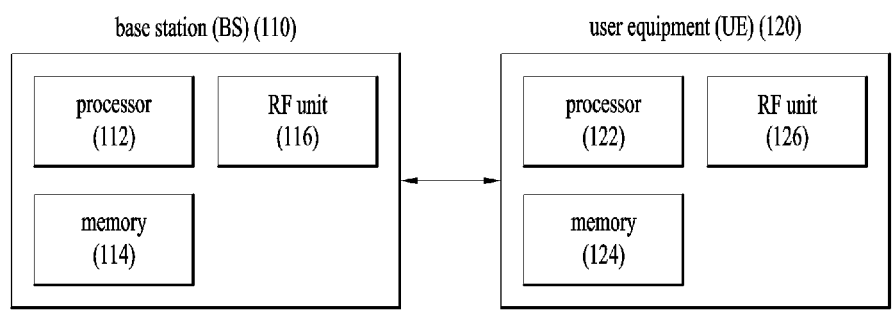
FIG. 16 is a diagram for a base station and a user equipment applicable to an embodiment of the present invention.

FIG. 16 is a diagram for an example of a base station and a user equipment capable of being applied to an embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 16, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Although the method of receiving control information in a wireless communication system and an apparatus therefor are described centering on examples applied to 3GPP LTE system, it may be applicable to various kinds of wireless communication systems as well as to the 3GPP LTE system.

What is claimed is:

1. A method of receiving downlink control information (DCI) by a user equipment (UE) in a wireless communication system, the method comprising:
    receiving the DCI by monitoring a radio resource region,
    wherein the DCI is detected by borrowing a part of a count of blind decoding assigned to a UE-specific search space (USS),
    wherein the radio resource region is not on the USS,
    wherein the DCI indicates whether or not uplink transmission is to be performed, and
    wherein the DCI is simultaneously transmitted to each of a plurality of UEs to indicate whether or not the uplink retransmission is to be performed.

2. The method of claim 1, further comprising receiving information on a position of a field to which an identifier of the UE is assigned in the DCI.

3. The method of claim 1, wherein a position of a field to which an identifier of the UE is assigned in the DCI is determined according to a total number of fields in which indication information on whether or not the uplink retransmission is performed is transmitted.

4. A method of receiving downlink control information (DCI) by a user equipment (UE) in a wireless communication system, the method comprising:
    receiving the DCI by monitoring a radio resource region,
    wherein the DCI is detected by borrowing a part of a count of blind decoding assigned to a UE-specific search space (USS),
    wherein the radio resource region is not on the USS,
    wherein the DCI indicates whether or not uplink transmission is to be performed,
    wherein the DCI is simultaneously transmitted to each of a plurality of UE groups to indicate whether or not the uplink retransmission is to be performed, and
    wherein each of the UE groups comprises at least one or more UEs having an identical group identifier.

5. The method of claim 4,
    wherein the uplink retransmission corresponds to non-adaptive retransmission-based uplink retransmission.

6. The method of claim 4, wherein each of the UE groups is configured to set an identical radio resource region to monitor the DCI.

7. A user equipment (UE) for receiving downlink control information (DCI) in a wireless communication system, the UE comprising:
- a radio frequency (RF) unit; and
- a processor coupled to the RF unit,
- wherein the processor is configured to receive the DCI by monitoring a radio resource region,
- wherein the DCI is detected by borrowing a part of a count of blind decoding assigned to a UE-specific search space (USS),
- wherein the radio resource region is not on the USS,
- wherein the DCI indicates whether or not uplink transmission is to be performed, and
- wherein the DCI is simultaneously transmitted to each of a plurality of UEs to indicate whether or not the uplink retransmission is to be performed.

8. The UE of claim 7, wherein the processor is further configured to receive information on a position of a field to which an identifier of the UE is assigned in the DCI.

9. The UE of claim 7, wherein a position of a field to which an identifier of the UE is assigned in the DCI is determined according to a total number of fields in which indication information on whether or not the uplink retransmission is performed is transmitted.

\* \* \* \* \*